United States Patent [19]
Klingler

[11] 3,976,740
[45] Aug. 24, 1976

[54] METHOD OF FORMING A THERMOMETER STRUCTURE

[75] Inventor: Josef F. Klingler, Wilmette, Ill.

[73] Assignee: Thermex, Inc., Chicago, Ill.

[22] Filed: Apr. 3, 1972

[21] Appl. No.: 240,551

Related U.S. Application Data

[62] Division of Ser. No. 883,865, Dec. 10, 1969, Pat. No. 3,689,339.

[52] U.S. Cl.............................. 264/229; 264/251; 264/296; 264/297
[51] Int. Cl.² .......................................... B29F 1/14
[58] Field of Search ........... 264/296, 297, 229, 257, 264/251; 425/111

[56] References Cited
UNITED STATES PATENTS

| | | | |
|---|---|---|---|
| 2,438,348 | 3/1948 | Morin | 264/251 |
| 2,577,584 | 12/1951 | Hofreiter | 264/157 |
| 2,794,211 | 6/1957 | Brown | 425/111 X |
| 3,301,931 | 1/1967 | Morin | 264/157 X |
| 3,385,553 | 5/1968 | Braun | 425/111 X |

*Primary Examiner*—Richard R. Kucia
*Attorney, Agent, or Firm*—Hofgren, Wegner, Allen, Stellman & McCord

[57] ABSTRACT

A method of forming a thermometer structure, such as a low cost clinical thermometer, wherein the thermometer enclosure structure is formed of plastic as by molding. The capillary element of the thermometer is molded about a taut wire and is removed from the molding cavity by being urged along the wire to an exterior position. The thusly removed element is utilized as a pressure-applying means on the wire to hold the wire taught for subsequent molding of a subsequent element in the mold cavity. The subsequent element is then utilized to remove the previous element from the end of the wire and replace it as the means for holding the wire taut for molding a second subsequent element about the wire. A scale is located on the capillary element by accurately determining the top of the liquid column at a preselected temperature and coordinating the placement of the scale on the element relative to said determined level. One end of the capillary bore is closed by a heat sealing process wherein a projecting portion of the element is deformed to seal the bore end.

12 Claims, 14 Drawing Figures

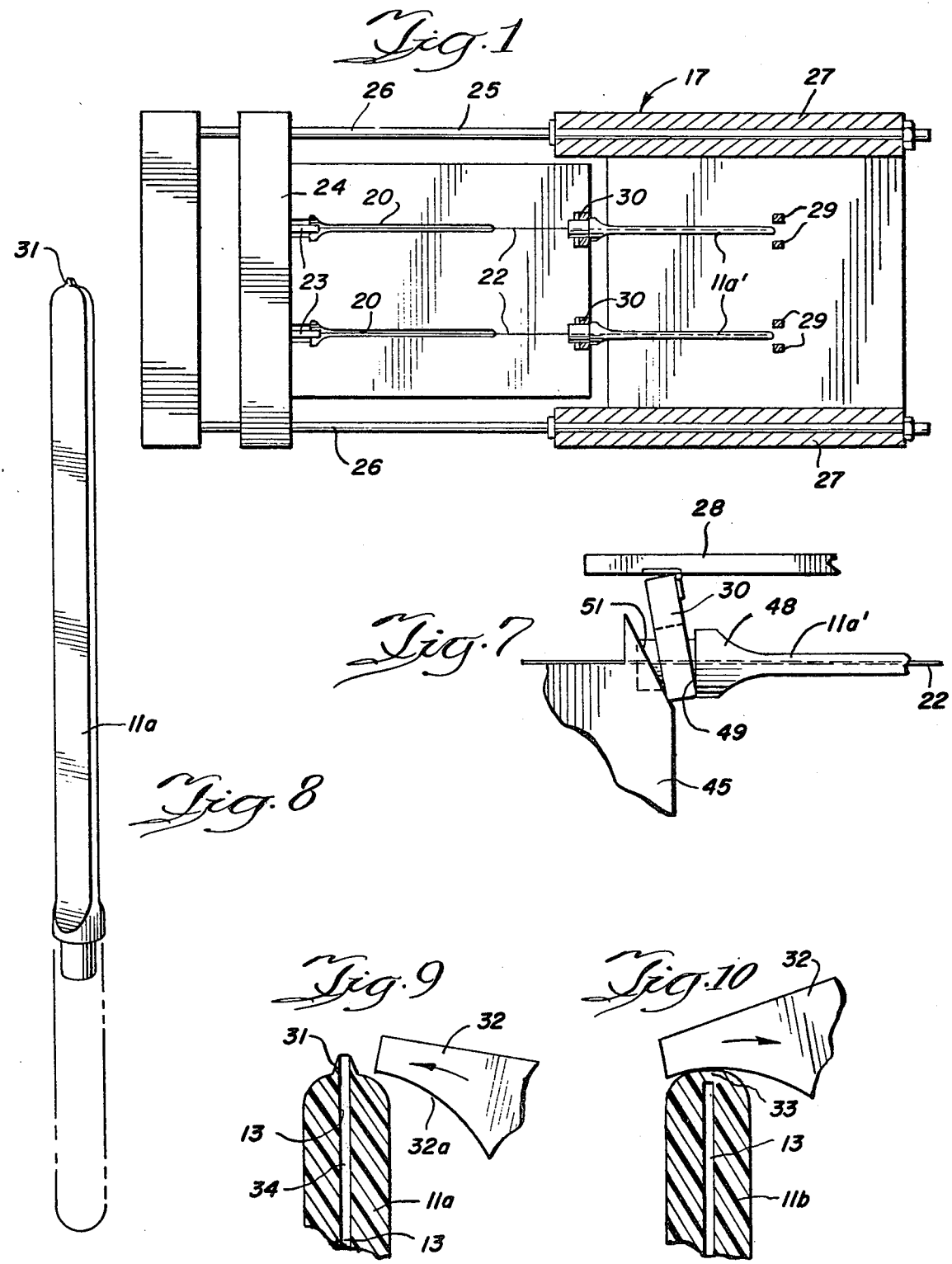

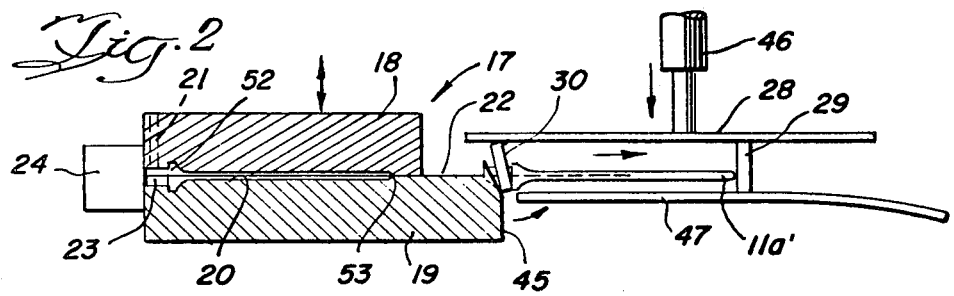
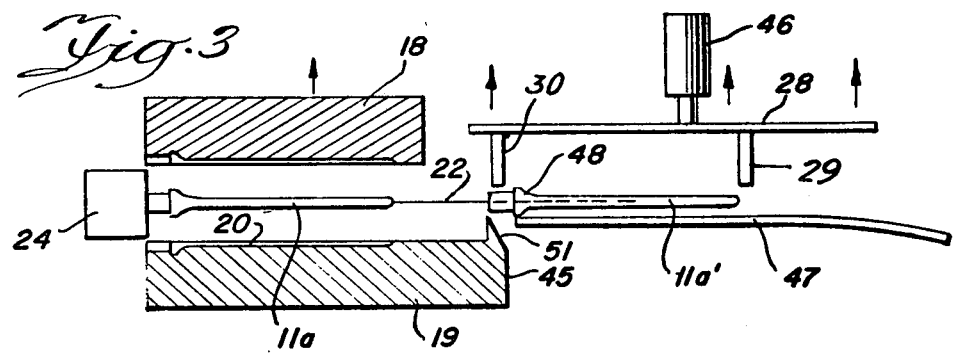
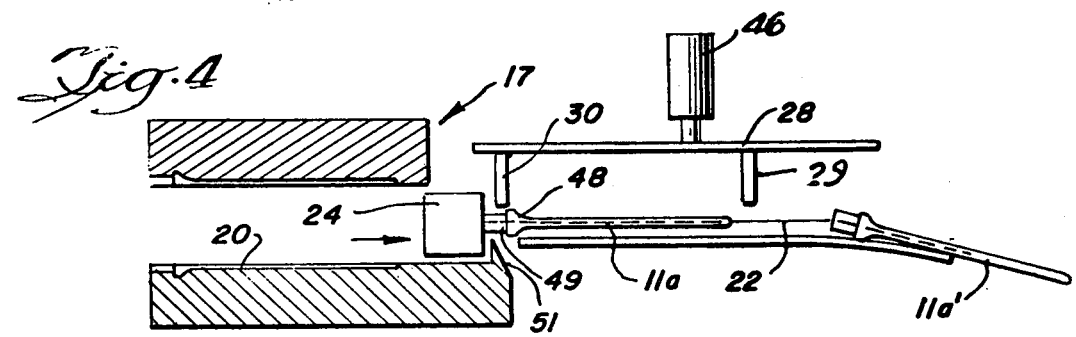
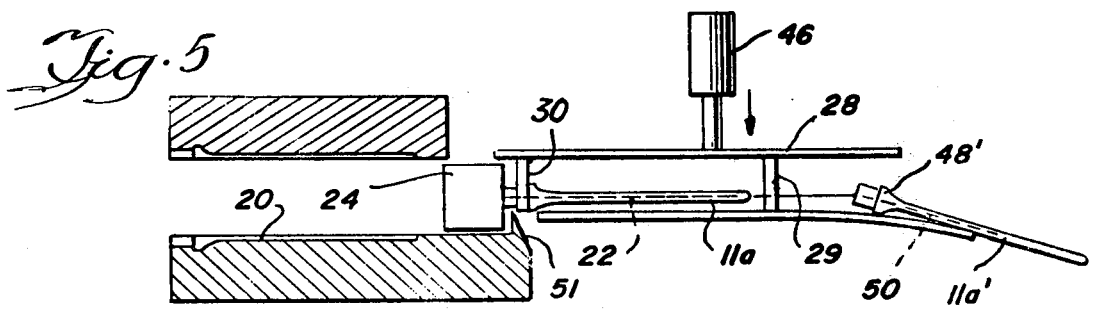
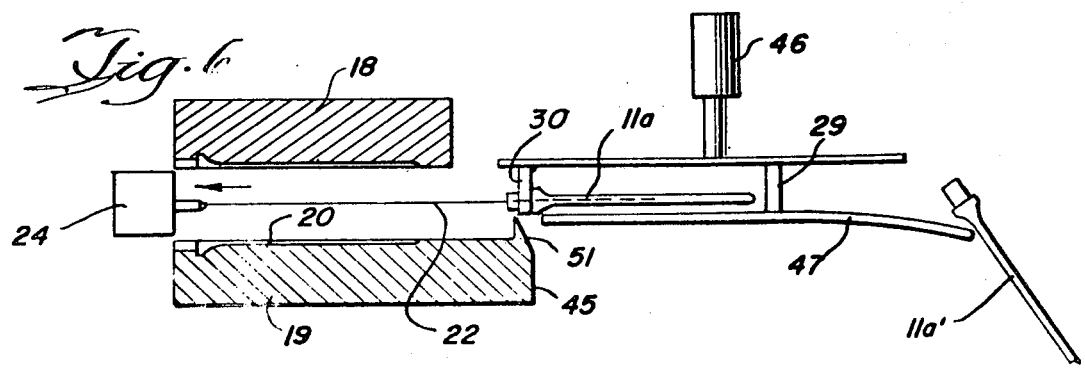

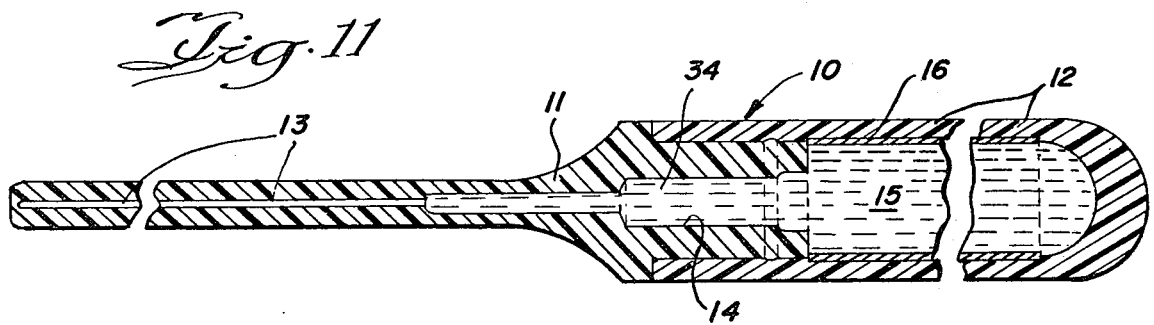
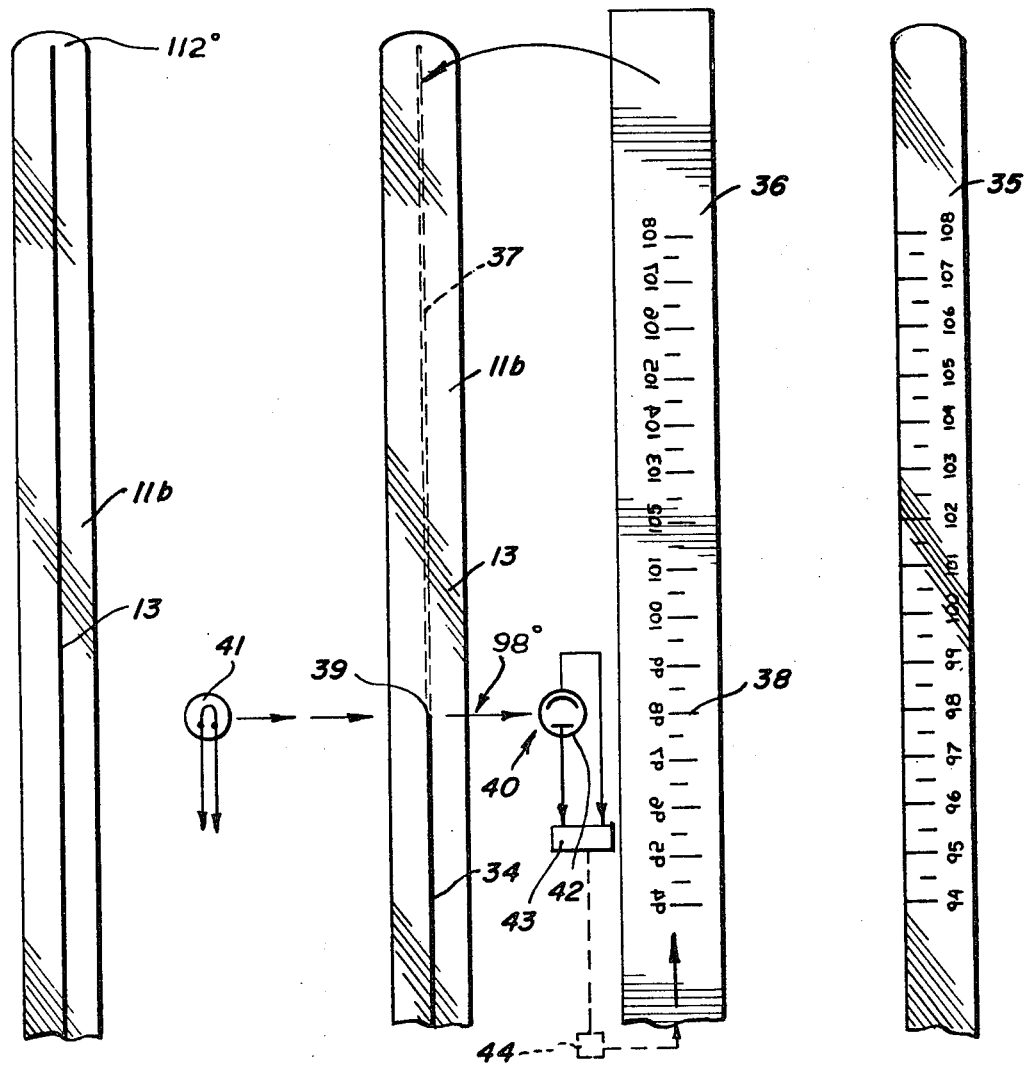

METHOD OF FORMING A THERMOMETER STRUCTURE

This is a division of application Ser. No. 883,865 filed Dec. 10, 1969, issued Sept. 5, 1972 as U.S. Pat. No. 3,689,339.

BACKGROUND OF THE INVENTION

1. Field of the Invention

This invention relates to thermometers and in particular to the forming of low cost molded thermometers.

2. Description of the Prior Art

The conventional glass thermometer has a number of serious disadvantages. While the thermometer is capable of reuse, as by sterilization thereof, the sterilization process is relatively costly and time-consuming. Further, such glass thermometers are relatively expensive. There has, therefore, developed a need for a low cost, one-time use thermometer obviating the need for sterilization, etc. An example of one such thermometer is that shown in U.S. Pat. No. 3,350,490 (LeBeau).

SUMMARY OF THE INVENTION

The present invention comprehends a method of forming such a low cost molded plastic thermometer having a number of desirable advantages over known such thermometers. More specifically, the present invention comprehends an improved method of forming a thermometer including the steps of forming an enclosure including a capillary element having a substantially uniform diameter capillary through bore, and a bulb element at one end of the capillary element, the bulb element having a reservoir chamber in communication with the capillary bore at one end, filling the enclosure with an indicator liquid, sealingly closing the other end of the capillary bore while maintaining the temperature of the liquid in the connected elements at a preselected high temperature, cooling the liquid in the fully sealed connected elements to a preselected lower temperature, locating the top of the liquid column in the capillary bore at the lower temperature, and placing a preselected scale on the capillary element with an indicium thereof corresponding to the lower temperature positioned accurately in alignment with the located top of the liquid column.

Still further, the invention comprehends the provision of a method of forming a capillary element for use in such a thermometer including the steps of forming a thermoplastic capillary element having a capillary bore opening through one end of the element, providing on the one end an outwardly tapering projection through which the bore opens, providing thermal energy to the projection plastic, and deforming the projection to dispose a portion thereof sealingly across the one end of the capillary bore.

Yet further the invention comprehends the provision of a new and improved method of forming such a thermometer structure including the steps of molding about a taut wire in a cavity a thermoplastic capillary element, urging the molding element and the wire to a position outside the molding cavity, and maintaining a force against the molded element on the wire to maintain a preselected tension in the wire during a subsequent molding of a subsequent capillary element about the wire in the cavity.

More broadly, the invention comprehends the forming of a plurality of plastic bodies on a wire by a process including the steps of providing a plurality of separable mold elements defining in a closed position a mold cavity, disposing a wire in a molding position extending tautly through the cavity, molding a plastic body about the taut wire in the cavity, separating the mold elements to expose the molded body, moving the wire and molded body therein outwardly from between the mold elements, holding the molded body while moving the wire through the body to be redisposed in the molding position, moving the mold elements to the closed position, and repeating these steps.

Thus, the invention comprehends an improved method of locating a scale relative to the indicator liquid for economical accurate calibration of the thermometer. Economical sealing of the capillary element against the substantial pressures involved in such thermometer structures is provided by means of a unique capillary element projection design. The cost of the thermometer structure is further effectively minimized by facilitated handling of the molded capillary elements and the use thereof in maintaining the molding structure in a desired preselected arrangement during the molding operation.

BRIEF DESCRIPTION OF THE DRAWINGS

Other features and advantages of the invention will be apparent from the following description taken in connection with the accompanying drawing wherein:

FIG. 1 is a fragmentary top plan view of a molding apparatus for molding plastic bodies such as the capillary element of a plastic thermometer by a method embodying the invention;

FIG. 2 is a fragmentary vertical section thereof showing the arrangement of the molding apparatus as during a molding operation and with a previously formed capillary element disposed exteriorly of the molding element;

FIG. 3 is a view similar to that of FIG. 2 showing a subsequent step in the forming operation with the mold elements spaced apart and with the means for retaining the previously formed capillary elements spaced therefrom;

FIG. 4 is a view similar to that of FIG. 3 showing a subsequent step in the forming operation wherein the newly formed capillary element is moved on the forming wire to exteriorly of the molding elements and with the previously formed capillary element moved further along the support structure;

FIG. 5 is a view similar to that of FIG. 4 showing a subsequent step in the forming operation with the means holding the capillary elements positioned to be engaged first by the capillary element upon a withdrawal of the forming wire therethrough;

FIG. 6 is a view similar to that of FIG. 5 showing a subsequent step in the forming operation wherein the wire is fully withdrawn from the first formed capillary element permitting it to fall for suitable collection and is partially withdrawn from the last previously formed capillary element with the wire being returned to the original molding position;

FIG. 7 is a fragmentary enlarged vertical section illustrating the application of tension to the forming wire by the camming of the stop means;

FIG. 8 is a perspective view of a previously formed capillary element preform;

FIG. 9 is a fragmentary enlarged diametric section of one end of the capillary element illustrating a first step in the closure thereof;

FIG. 10 is a view similar to that of FIG. 9 illustrating the arrangement upon completion of the closure of the capillary element end;

FIG. 11 is a broken diametric section of the thermometer;

FIG. 12 is a fragmentary enlarged front elevation of a portion of the capillary element as shown upon completion of the closure of the end;

FIG. 13 is a view similar to that of FIG. 12 illustrating a step of detection of the top of the liquid indicator column at a preselected temperature and a stamping die for marking the capillary element with a scale accurately related to the determined level; and FIG. 14 is a front elevation of the capillary element with the scale provided thereon.

DESCRIPTION OF THE PREFERRED EMBODIMENT

In the exemplary embodiment of the invention as disclosed in the drawing, a thermometer generally designated 10 is shown to comprise a capillary element 11 having sealingly connected to one end thereof a bulb element 12. The capillary element is provided with an axial bore 13 having an enlarged stepped end portion 14 opening to a reservoir chamber 15 of the bulb element. The bulb element is provided with an internal sleeve 16 extending about the reservoir chamber. Each of the capillary element 11 and bulb element 12 herein is formed of a suitable plastic as by molding. Illustratively, the elements may be formed of polystyrene, polypropylene, etc. Capillary element 11 may be formed in a suitable injection mold apparatus 17, such as shown in FIG. 2, comprising a pair of mating dies 18 and 19 cooperatively defining a mold cavity 20. Fused plastic is delivered to cavity 20 through a suitable charging sprue 21. A wire 22 is extended coaxially through cavity 20 in the molding arrangement of the apparatus 17, as shown in FIG. 2, to define bore 13 of the capillary element preform 11a. Wire 22 is fixed at one end 23 to a support 24. Support 24 comprises a portion of a frame 25 provided with a pair of slide rods 26 movably received in a pair of slide carriers 27. Movably carried on the frame is a retainer member 28 having a first stop 29 spaced substantially from the mold elements 18 and 19 and a second, movable stop 30 juxtaposed to one end 45 of the mold element 19. The retainer member 28 is vertically selectably positioned by means of a suitable piston device 46 to move the stop elements 29 and 30 into and from the path of movement of capillary element preforms 11a formed in the mold apparatus 17.

Thus, as shown in FIG. 3, upon completion of the molding of the preform 11a, the retainer member 28 is raised and the mold elements 18 and 19 are separated to permit removal of the preform 11a from the mold cavity. This removal is effected by a forward movement of the support 24 thereby moving the preform 11a and the wire 22 on which the preform 11a is fixedly retained to beyond the forward end 45 of the molding element 19. The previously formed preform 11a' is slidably carried on a guide 47 at this time to be moved by the wire 22 to the right along the guide. As shown in FIG. 3, wire 22 may have a length such that at this time the wire extends only partially into the previously formed preform 11a'.

Referring now to FIG. 4, when the support 24 is advanced to its forwardmost position, preform 11a is disposed effectively outwardly of the molding apparatus 17. The preform includes a collar portion 48 defining an annular rear surface 49 adapted to be engaged by the bifurcated rear stop 30 as the retainer member 28 is lowered by piston 46 as shown in FIG. 5. The support 24 is then moved rearwardly, or to the left as seen in FIGS. 5 and 6, to withdraw wire 22 from preform 11a and urge the collar 48' of the previously formed preform 11a' against the forward stop 29. Thus, the forward end 50 of wire 22 is fully withdrawn from preform 11a' permitting the preform 11a' to fall downwardly from the forward end of the guide 47 for suitable collection as seen in FIG. 6. The support 24 is returned fully to the lefthand end of the dies 18 and 19 and, thus, draws the wire 22 across the space between the mold elements so as to dispose the wire coaxially of the mold cavity 20 when the die elements are again brought together to the position of FIG. 2. As the lower mold element 19 moves upwardly to the closed position, a camming surface 51 on the forward wall 45 engages the movable stop 30 to urge the preform 11a slightly to the right as seen sequentially in FIGS. 6 and 2 to apply a preselected tension to the wire 22 and thereby cause it to extend tautly across the mold cavity 20 accurately centering the taut wire thereacross to provide an accurately centered bore 13 in the next formed preform. The mold elements 18 and 19 define a rear portion 52 cooperatively forming the collar 48 and a forward portion 53 cooperatively defining the frustoconical projection 31 at the forward end of the preform.

Wire 22 preferably comprises a high tensile strength wire, such as carbon rocket wire. To preclude corrosion in the forming die, the wire may comprise a core of such material plated with a suitable cupriferous material. Illustratively, the wire may be brass plated. As discussed above, the wire may have a suitable diameter, such as 9 mils, 11 mils, etc., to provide the desired small capillary bore 13 in the capillary element.

As shown in FIGS. 9 and 10, a partially completed capillary element 11b is formed from the preform 11a (11a') by bringing a pressure member 32 laterally against frustoconical projection 31. Heat energy is simultaneously applied as through the member 32 to deform and fuse the plastic defining projection 31 into a closure portion 33 closing the distal end of the capillary bore 13, as shown in FIG. 10. The pressure surface 32a of the member 32 may be arcuate, as shown in FIGS. 9 and 10, to provide a controlled wiping action against projection 31 to assure a smooth plugging of the capillary bore end. The closure of the capillary bore 13 is effected with the capillary bore filled with indicator fluid 34 maintained at a preselected elevated temperature, such as 112°F. where the thermometer is intended for use in providing temperature indications in the range of approximately 94° to 108°F.

Referring now to FIGS. 12–14, the partially completed capillary element preform 11b is provided with suitable scale markings generally designated 35 by means of an impression die 36 which is pressed against the flat surface 37 of the capillary element to inscribe the scale 35 therein. The invention comprehends the locating of the scale 35 in a novel and simple manner. As shown, impression die 36 includes a series of indicia including illustratively a 98° indicium 38. While this particular temperature is selected in illustrating this invention, it will be obvious to those skilled in the art that any indicium on the scale may be employed for the purposes indicated.

Assuming that the 98° indicium is to be utilized as the reference indicium, the location of the top 39 of the column of indicator fluid 34 in capillary bore 13 may be determined as by the use of suitable photoelectric apparatus generally designated 40 including a radiation source 41 and a photoelectric pickup cell 42. The cell 42 may be connected to a suitable control 43 to mechanism 44 for adjusting the position of the impression die 36 to align indicium 38 with the liquid level top 39 and effect the impression of capillary element surface 37 to provide the scale 35 thereon in such accurate alignment. As the capillary bore 13 is highly uniform in cross-section throughout its length, the remaining indicia of scale 35 are suitably sufficiently accurately correlated with the location of the top 39 of the liquid indicator at the different indicator temperatures so that a high accuracy sufficient to meet clinical thermometer tests is obtained in this simple and economical manner. The mechanism 44 may be of suitable conventional construction adapted to translate the impression die 36; such structures being well known to those skilled in the art and require no further description herein. Similarly, control 43 may be of suitable conventional construction well known to those skilled in the art and requiring no further description herein.

The capillary bulb 12 herein is formed as a separate cup-shaped member as by being molded of a suitable plastic and is secured to the end of the capillary element by suitable fusion means. Illustratively, the capillary bulb element may be secured to the capillary element by sonic fusion. Apparatus for producing such sonic fusion of plastic materials is well known to those skilled in the art and requires no further description herein. Illustratively, the elements 11 and 12 may be formed of polystyrene, polypropylene, etc. The internal sleeve 16 is formed of a suitable rigid material, such as metal, and illustratively may form a cold rolled steel sleeve which, as discussed above, is preformed and embedded in the plastic of bulb element 12 during the molding operation to provide intimate association of the sleeve with the bulb. The connection of the bulb element 12 to the capillary element 11 may be effected prior to the closing of the distal end of the capillary element to define the closure portion 33 and, thus, the entire thermometer is filled with the indicator liquid prior to the closure of the capillary element end.

The foregoing disclosure of specific embodiments is illustrative of the broad inventive concepts comprehended by the invention.

I claim:

1. A method of forming a thermometer structure comprising the steps of: molding about a taut wire in a cavity an elongated thermoplastic capillary element; urging the molded element on the wire to a position outside the molding cavity; and maintaining a force against the molded element on the wire to transfer the force to the wire as a result of the substantial frictional engagement therebetween to maintain the wire taut during a subsequent molding of a subsequent capillary element about the wire in the cavity.

2. The method of forming a thermometer structure of claim 1 wherein an abutment member is urged against one end of the molded capillary element to maintain said force.

3. The method of forming a thermometer structure of claim 1 wherein said first named molded capillary element is urged off one end of the wire as an incident of a movement of the wire outwardly therefrom.

4. The method of forming a thermometer structure of claim 1 wherein said wire is metal coated.

5. The method of forming a thermometer structure of claim 1 wherein said wire is coated with brass.

6. The method of forming a thermometer structure of claim 1 wherein said molded element is substantially fixedly positioned on the wire during movement thereof to said position outside the molding cavity.

7. The method of forming a thermometer structure of claim 1 wherein said molded element is retained at said position outside of the mold cavity and said wire is withdrawn through the retained molded element to be redisposed in the cavity for molding the subsequent element thereon.

8. A method of forming a plurality of plastic bodies on a wire comprising the steps of:
    providing a plurality of separable mold elements defining in a closed position a mold cavity;
    disposing a wire in a molding position extending tautly through the cavity;
    molding an elongated plastic body about the taut wire in the cavity;
    separating the mold elements to expose the molded body;
    moving the wire and molded body thereon outwardly from between the mold elements;
    holding the molded body while moving the wire through the body to be redisposed in said molding position;
    moving the mold elements to the closed position; and repeating the above named steps.

9. The method of forming a plurality of plastic bodies of claim 8 wherein said wire is partially withdrawn from the molded body as an incident of said wire being redisposed in said molding position.

10. The method of forming a plurality of plastic bodies of claim 8 wherein the wire is fully withdrawn from a previously molded body as an incident of said wire being redisposed in said molding position.

11. The method of forming a plurality of plastic bodies of claim 8 wherein the wire is fully withdrawn from a first previously molded body and partially withdrawn from a second molded body as an incident of said wire being redisposed in said molding position.

12. The method of forming a plurality of plastic bodies of claim 8 wherein said molded body is fixedly retained on said wire during said movement thereof outwardly from between the mold elements.

* * * * *